US012447487B1

(12) United States Patent
Slavich

(10) Patent No.: US 12,447,487 B1
(45) Date of Patent: Oct. 21, 2025

(54) MOBILE SPRAYER BACKPACK

(71) Applicant: Bruce Slavich, Ventura, CA (US)

(72) Inventor: Bruce Slavich, Ventura, CA (US)

( * ) Notice: Subject to any disclaimer, the term of this patent is extended or adjusted under 35 U.S.C. 154(b) by 0 days.

(21) Appl. No.: 19/083,918

(22) Filed: Mar. 19, 2025

Related U.S. Application Data

(60) Provisional application No. 63/569,216, filed on Mar. 25, 2024.

(51) Int. Cl.
*B05B 9/08* (2006.01)

(52) U.S. Cl.
CPC ............ *B05B 9/0888* (2013.01); *B05B 9/085* (2013.01)

(58) Field of Classification Search
CPC ......... B05B 9/0888; B05B 9/085; A45F 3/04; A01M 7/0046
See application file for complete search history.

(56) References Cited

U.S. PATENT DOCUMENTS 10,548,361 B1 * 2/2020 Suttman .................... A45F 3/04
12,194,487 B1 * 1/2025 Albelo .................. B05B 9/0861
2002/0170935 A1 * 11/2002 Annis ................... A61M 1/062 224/655
2005/0279293 A1 * 12/2005 Vaughan ................. B05B 9/085 122/36
2006/0243765 A1 * 11/2006 Valeriana .................. A45F 3/20 224/148.2
2010/0155447 A1 * 6/2010 Zheng .................... A45C 15/00 224/629
2012/0048420 A1 * 3/2012 Martin .................. B05B 9/0888 141/1
2017/0252757 A1 * 9/2017 Peterson ............. A01M 7/0046
2019/0125908 A1 * 5/2019 Swartz ...................... A61L 2/18
2019/0388918 A1 * 12/2019 Gustafson ............. B05B 9/0861
2020/0122187 A1 * 4/2020 DiStefano ............. B05B 9/0403
2021/0394207 A1 * 12/2021 Ryan ..................... B05B 9/0426
2023/0330283 A1 * 10/2023 Ruiz ......................... A45F 3/04
2024/0001384 A1 * 1/2024 Li ........................... F04B 49/06

* cited by examiner

*Primary Examiner* — Joseph A Greenlund
(74) *Attorney, Agent, or Firm* — Sandy Lipkin

(57) ABSTRACT

A mobile spray device that is wearable on the back of a user that incorporates a fill hose of ¼" diameter and a spray hose of ⅛" diameter, the hoses being connected to a pump housed in a top front compartment of said device which is connected to a battery and controller housed in a bottom front compartment of said device, both top and bottom compartments having hard outer shells, and wherein these compartments have apertures that allow for connection of wires from the battery and controller and hoses to pass through an intermediate safety compartment which then pass through into a thermofoil lined bladder compartment which houses a bladder capable of holding 4 liters or more of fluid and having a large dial with a hook that latches onto a loop in the bladder compartment so it remains upright at all times. Drainage ports on the bottom of the device allow for safety removal of fluid in the case of a leak. The spray hose exits the bladder compartment, is securable over the shoulder to a strap wherein the spray nozzle, made of metal, is securable via a magnet into a holster on one of straps.

19 Claims, 14 Drawing Sheets

MOBILE SPRAYER BACKPACK

REFERENCE TO PRIOR APPLICATION

This application claims priority of the provisional patent application 63/569,216, filed Mar. 25, 2024 entitled AIRLESS ELECTRONIC SPRAYER SYSTEM BACKPACK TOOL FOR THE USE OF INSTALLING WINDOW TINTING, PAINT PROTECTION FILM (PPF), VINYL GRAPHICS AND DETAILING by Bruce John Slavich.

BACKGROUND OF THE INVENTION

Field of the Invention

The field of this invention relates generally to the field of window tinting, paint protection film and vinyl graphic installation as well as automotive detailing, and more particularly toward an airless application system that is contained in a mobile backpack that allows for the ease and safety of application by a single user.

Description of the Prior Art

When applying liquids of all sorts to all sorts of surfaces, prior art methods involved pressurized air tanks and clunky devices. The inventor of the instant invention is a leader in the industry in developing airless, mobile systems that allow for ease of application and increased safety. Notably, the system eliminates the need for compressed air and all of the concerns that go along with it. The instant invention provides many improvements over the original mobile airless backpacks that were originally developed by the instant inventor.

The instant invention provides many heightened improvements over the inventor's original airless electronic utilitarian mobile spray pack for use with window tinting, paint protection film application, vinyl wrapping, detailing, window washing, HVAC and concrete finishings, all of which will be further detailed below.

SUMMARY OF THE INVENTION

The basic embodiment of the present invention teaches a mobile spray device that can be worn on the body of a user comprising: an enclosed main body with a bottom, a top, back panel, a front panel and side walls that are openable with a first zipper that opens up a back compartment, said back compartment further comprising: a thermofoil lining through an interior portion of said back compartment; and a hook and loop strap proximate a top rear of said interior portion of said back compartment; an intermediate compartment in front of said back compartment with a second zipper, said intermediate compartment further comprising: apertures on one side to receive wires and hoses; and an aperture on an opposite side to transfer hoses into said back compartment; a top front compartment in front of said intermediate compartment, said top front compartment further comprising: corresponding apertures with said apertures one side of said intermediate compartment for the placement therethrough of wires; securing area for a controller; and a sleeve for the housing of a battery; a bottom front compartment below said top front compartment, said bottom front compartment further comprising: an aperture to correspond to said aperture on said opposite side of said intermediate compartment for the placement therethrough of hoses from a pump; and a sleeve for the housing of a pump; a bladder with a capacity of four liters or more of fluid, said bladder having a large dial for the introduction of fluid thereon, said large dial including a hook for attachment to said hook and loop strap proximate said top rear of said interior portion of said back compartment, said bladder having an attachment to a fill hose, said fill hose passing through an aperture in said back compartment, through said aperture in said intermediate compartment into said bottom front compartment, said fill hose being attached to a first side of a pump containable in said sleeve for the housing of a pump; a spray trigger attached to a spray hose, said spray hose being smaller in diameter than said fill hose and said spray house passing through said aperture in said back compartment into said bottom front compartment, said spray hose being attached to a second side of said pump containable in said sleeve for the housing of a pump; and a pair of straps on said back of said mobile spray device configured to allow for the wearing of said device on the back of a user.

The above embodiment can be further modified by defining that said spray hose has a diameter of ⅛".

The above embodiment can be further modified by defining that said fill hose has a diameter of ¼".

The above embodiment can be further modified by defining that quick connectors connect said fill hose and said spray hose to said pump.

The above embodiment can be further modified by defining that crimped hose clamps are used to secure said spray hose and said fill hose with a clamp heat sink used to protect said crimped hose clamps.

The above embodiment can be further modified by defining that said pump is a 12V 90 psi reinforced diaphragm pump with a four screw head and nylon reinforced body plate cover.

The above embodiment can be further modified by defining that said front top compartment and said front bottom compartments are covered with hard shell covers.

The above embodiment can be further modified by defining that said controller has an on/off switch with a PCM circuit board to regulate voltage and an LED level indicator to indicate battery charge.

The above embodiment can be further modified by defining that said battery is a rechargeable lithium battery with a cylindrical shape.

The above embodiment can be further modified by defining that a battery charger in the shape of said battery is used to charge said battery.

The above embodiment can be further modified by defining that said spray trigger is made of metal.

The above embodiment can be further modified by defining that a magnet is incorporated into a holster on one of said pair of straps for securement thereto of said metallic spray trigger.

The above embodiment can be further modified by defining that military stitching is used to secure all compartments together.

The above embodiment can be further modified by defining that molded back pads are incorporated into said back of said mobile spray device.

The above embodiment can be further modified by defining that ventilated foam pads are incorporated into said back of said mobile spray device.

The above embodiment can be further modified by defining that one or more drainage ports are located at said bottom of said mobile spray device.

The above embodiment can be further modified by defining that hose keepers are attached to one of said pair of straps to secure said spray hose therein.

The above embodiment can be further modified by defining that brass swivels are attached to said spray hose.

The above embodiment can be further modified by defining that brass swivels are attached to said fill hose.

The above embodiment can be further modified by defining that a PVC top handle grip is attached to said top of said mobile spray device.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
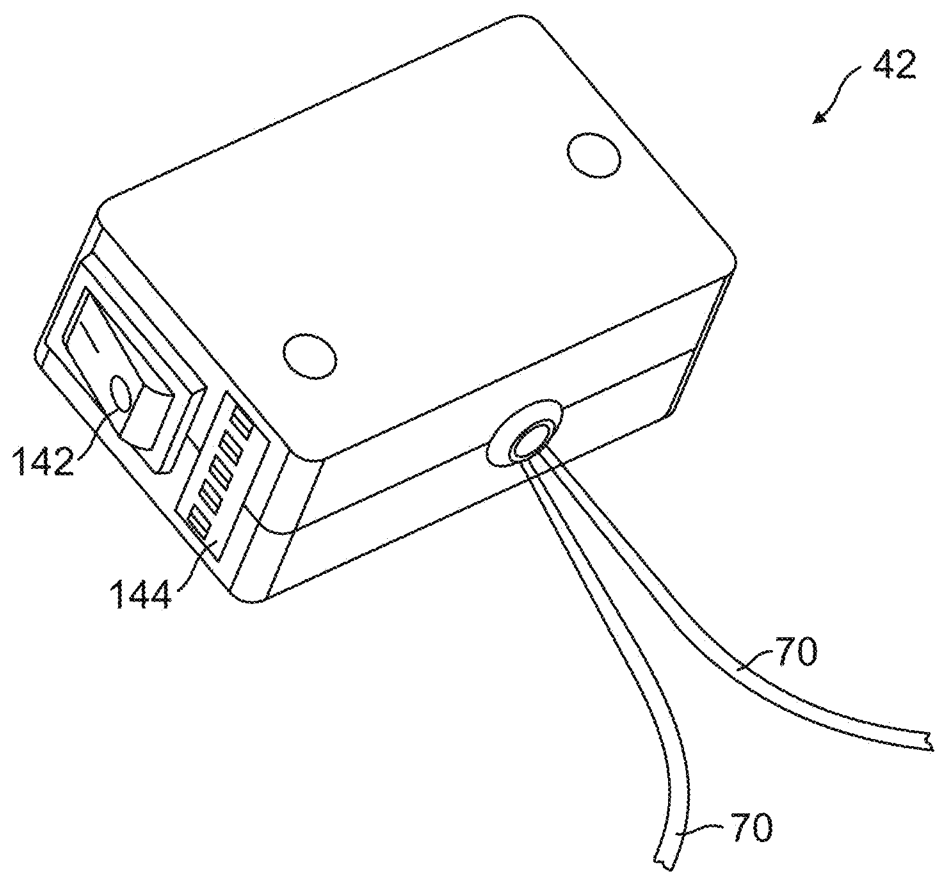
FIG. 1 is a top perspective view of the specialized controller of the device of the instant invention.

The preferred embodiment of the instant invention provides for an airless electronic utilitarian mobile spray pack for use as an aid for window tinting as well as paint protection film (PPF) application, vinyl wrapping, detailing, window washing, HVAC and concrete finishings. The instant inventor has been a leader in the industry since 2020 and has significantly increased the utility and safety of the invention with specialized additions.

The instant invention incorporates a ⅛ inch spray hose for higher pressure output and greater conservation of liquid in the device. Specialized quick connectors have been incorporated into the connection of the hoses to the pump. Furthermore, a specialized bladder has been included that can contain four or more liters of fluid. A back compartment has been added that incorporates insulated thermofoil for the compartment in which the bladder is housed. This allows for whatever liquid is used to remain cool or hot, depending on the application.

Worm style hose clamps on prior art devices can loosen over time and create fluid leakage which can be dangerous in close proximity to electronic components. The hose clamps in the instant invention are crimped to alleviate this hazard. Additionally, clamp heat shrink is used to protect the clamps, thereby minimizing or avoiding entirely the risk of snags and damage. The aforementioned stainless steel hose quick connectors aid in the ability to disconnect the hose in case of need for repair and also allows for the flexibility of the easily change out of different length hoses, depending on the application.

Also mentioned previously, the ⅛ inch spray hose saves weight and fatigued on the user compared to larger diameter hoses, which are heavier and more restrictive. In the instant system and ¼ inch hose is used to connect the pump to the bladder for a fast fill whereas the ⅛ inch hose allows for fluid to exit the bladder into the spray house under higher pressure while conserving fluid, as well as being more lightweight.

The pump of the instant invention is also a specialized improvement in the system. It is a 12 volt 90 psi reinforced diaphragm pump that has a 4-screw head and nylon reinforced body plate covers. The backpack itself has custom molded hard shell compartment covers protecting the vital components housed therein. Inside of these compartments are dedicated sleeves for the custom battery (top compartment) and the pump (bottom compartment). The controller is housed directly next to the battery for connection thereto with a hole that allows for the wires to be routed into a specialized safety intermediate compartment where the wiring is all segregated from the compartment that houses the bladder containing liquids, thereby greatly improving safety.

The controller is also specialized in that it contains a custom made on/off switch with a PCM circuit board to regulate the voltage, thereby providing improved safety. An LED level indicator lets the user see the level of charge on the battery and whenever a recharge is required. The battery itself is a lithium ion battery has a custom shape to be charged in its own custom charger. A battery pouch/sleeve housed in the top, front compartment allows for securement of the battery therein away from other components but also allows for easy removal for charging. This is an enhanced safety feature over prior art flat battery packs with a wall charger.

A magnet is incorporated in the system to secure the spray trigger which is made of metal and will secure itself to the magnet. The magnet holds the spray trigger in its holster and prevents it from slipping out. The brass trigger on the spray nozzle improves longevity and provides for a smaller, easier grip than those found on a polymer plastic sprayer typically used in the prior art.

The backpack itself is made with durable materials and dedicated reinforced compartments with hard shell lids with reinforced military stitching as well as custom molded comfort back pads on the back as well as ventilated foam pads on the back.

Mentioned previously, the four plus liter bladder is larger than anything in the prior art and is outfitted with a large screw cap that is more secure than prior art bladder caps. Around the screw cap is a hook that allows for the bladder to attach to a hook and loop clasp in the bladder compartment so it remains vertically upright and does not collapse inside the compartment.

Mentioned previously was the dedicated compartment for the wiring to be segregated from the rest of the back pack. This compartment provides water resistance for the wire connections and keeps them hidden and out of the way, which makes for a safer and cleaner orientation.

Adjustable side straps and a front padded harness better secure the pack onto the user and keeps the pack higher on the back which is more ergonomic for the user versus a pack that hangs lower on the back. There are also dedicated drainage ports on the bottom of the pack for the two inner compartments in the case that liquid should leak, the liquid can exit the pack safely instead of filling the pack with water potentially damaging the electronic components.

Hose keepers in the form of plastic over the shoulder hook and loop rings inside the pack secure the hoses throughout the pack to secure the hoses and keep them out of the way. Custom made brass swivels with chemical resistant seals are used for both the ¼ inch and ⅛ in hoses. Finally there is a custom PVC grip carry handle on the top of the pack.

Turning to the drawings, the preferred embodiment is illustrated and described by reference characters that denote similar elements throughout the several views of the instant invention.

Figure 2:
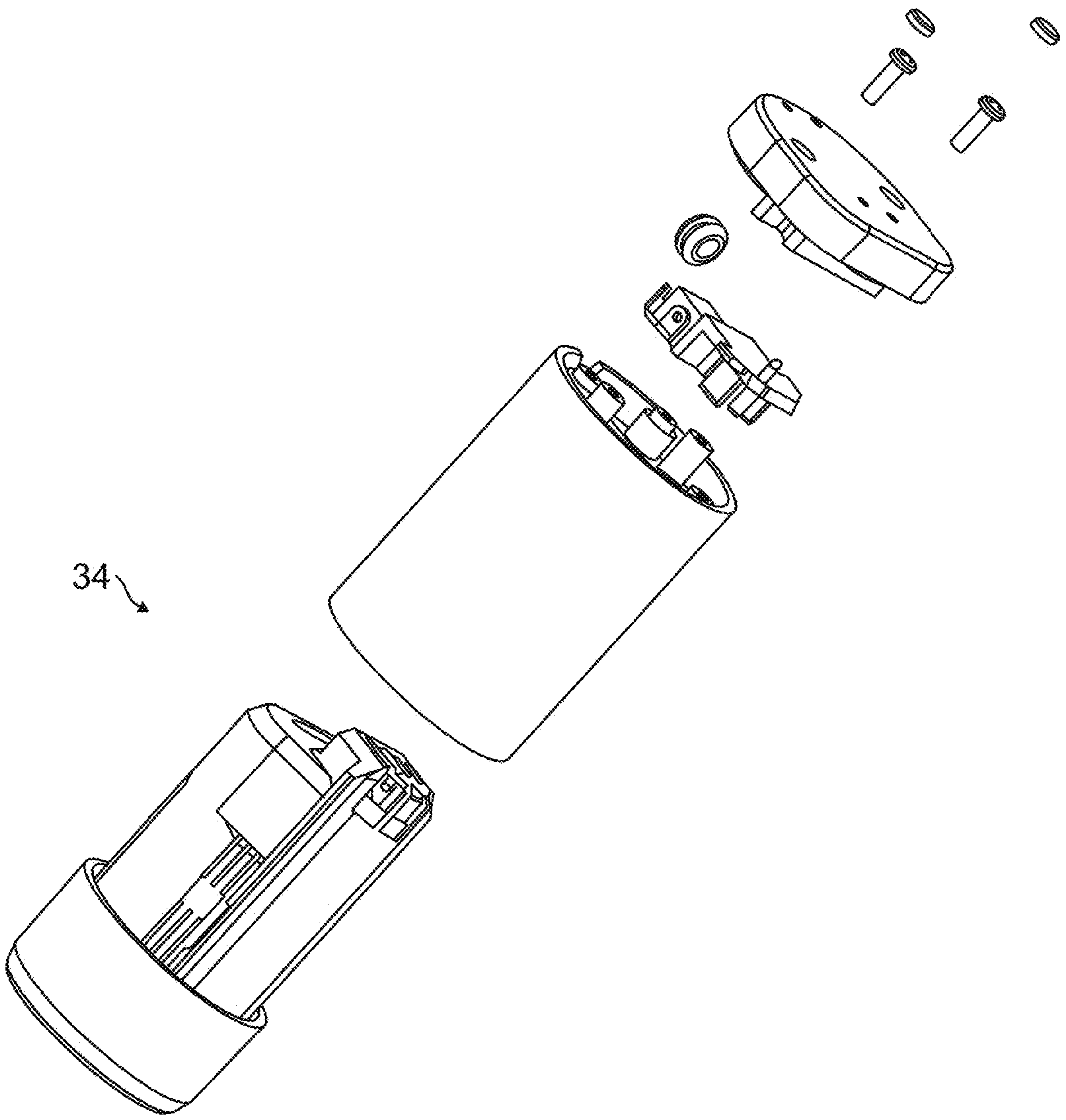
FIG. 2 is an exploded view of the specialized battery developed specifically for the instant invention.

FIG. 1 shows the specialized controller 42 of the instant invention which connects the battery 34 to the pump 50. The controller 42 includes a first wire 70 which connects to the battery 34 and a second wire 74 which connects to the pump 50. The wires 70, 74 are treated with heat shrink for water resistant connections. The on/off switch 142 connects with a PCM circuit board to regulate the voltage, thereby providing improved safety. An LED level indicator 144 lets the user see the level of charge on the battery 34 and whenever a recharge is required. The controller 42 is made of a custom molded nylon PVC case. The battery 34 itself is custom made for this backpack 10 and is shown in exploded view in FIG. 2.

Figure 3:
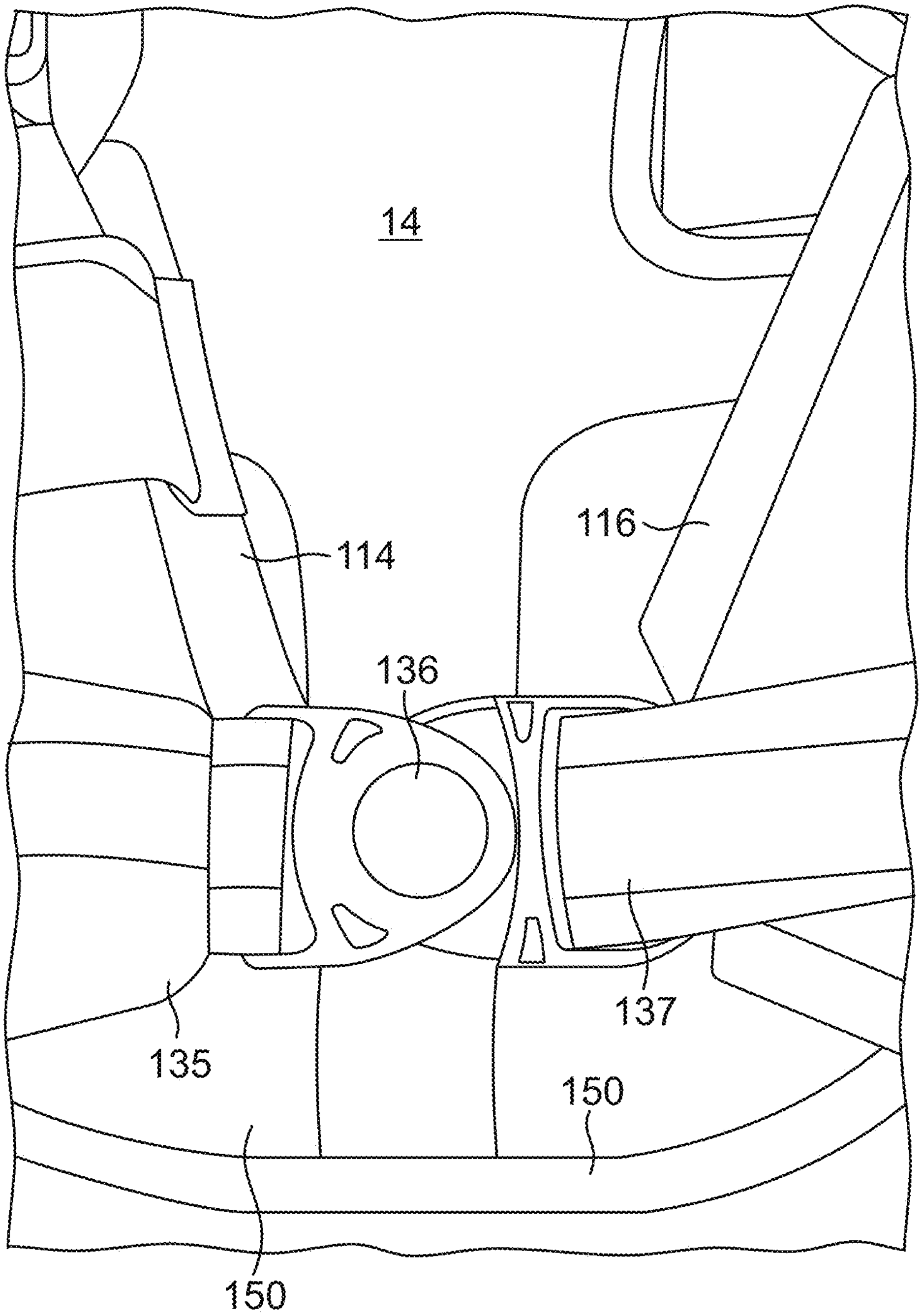
FIG. 3 is a close-up view of the back portion of the backpack of the instant invention with its specialized securing portions.

FIG. 3 shows the back 14 of the backpack 10 where the bottom portion of the first strap 114 and the bottom portion of the second strap 116 are shown as they connect together to snap in place with the large buckle which is a nylon safe clip chest connector 136. When separated, each half is connected to the first side of the bottom strap 135 and the second side of the bottom strap 137. Also visible are the padded portions 150 on the bottom part of the back 14 of the backpack 10.

Figure 4:
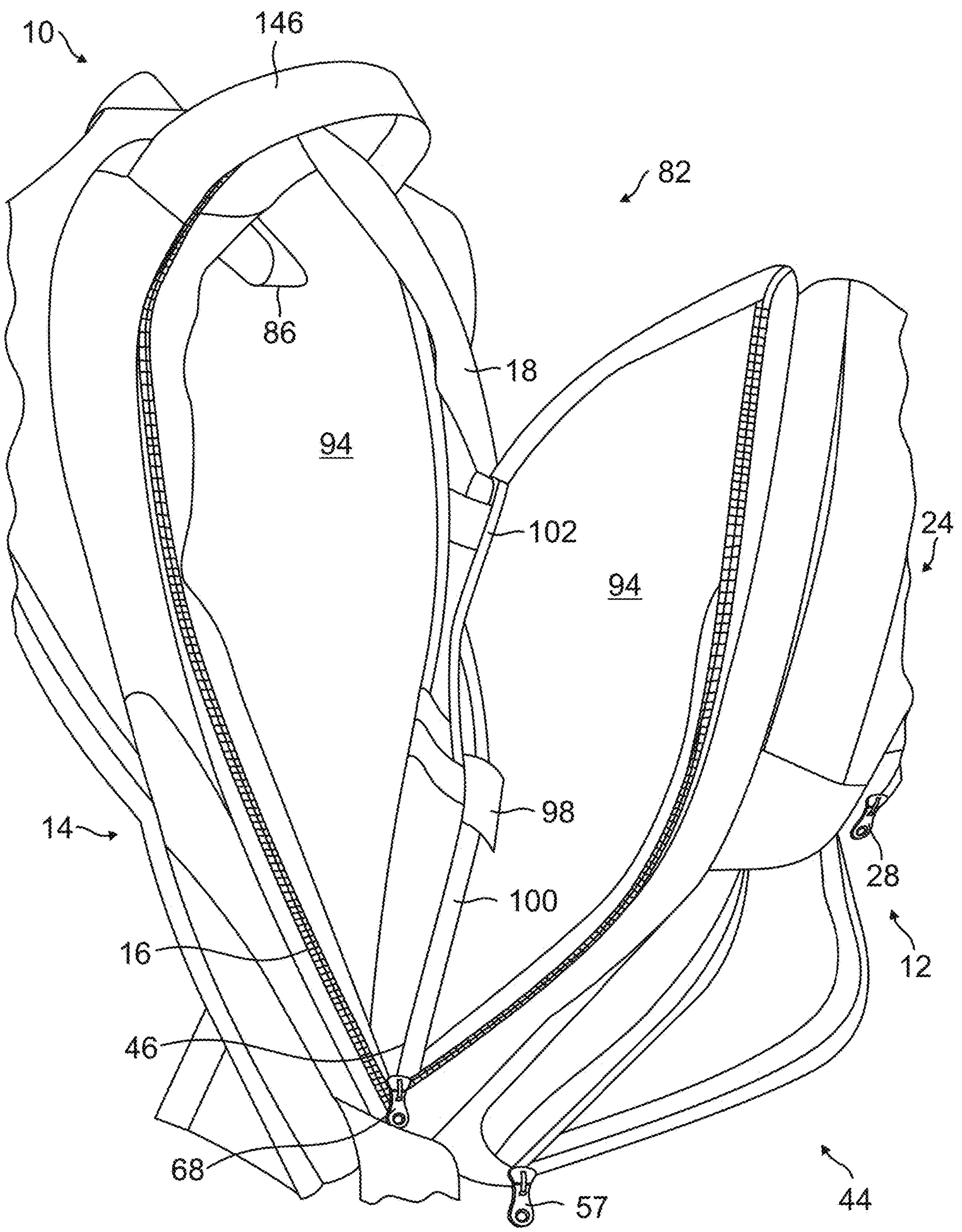
FIG. 4 is a side view of the backpack of the instant invention open to the thermally insulated pocket.

FIG. 4 illustrates one of the major inventive portions of the backpack 10 of the instant invention, which is the bladder compartment 82 with thermal insulation 94 on the walls of the compartment 82. This is an important innovation in that it keeps the fluid in the bladder cold or hot, depending on the application. Also seen in this view is the front 12 of the backpack 10, the back 14 of the backpack 10 and both sides 16, 18. A zipper 68 opens and closes this compartment 82. Also shown is the zipper 57 that opens and closes the bottom front compartment 44 and the zipper 28 that opens and closes the top front compartment 24. The bladder connecting strap 86 is shown near the top of this compartment 82 to attach the bladder thereto and keep it vertically upright. There is also an aperture 96 through which portions of the 14 inch diameter hose 100 and the ⅛-inch diameter hose 102 passe through and are secured therein with a hose keeper 98. Also see is the top strap carry handle 146.

Figure 5:
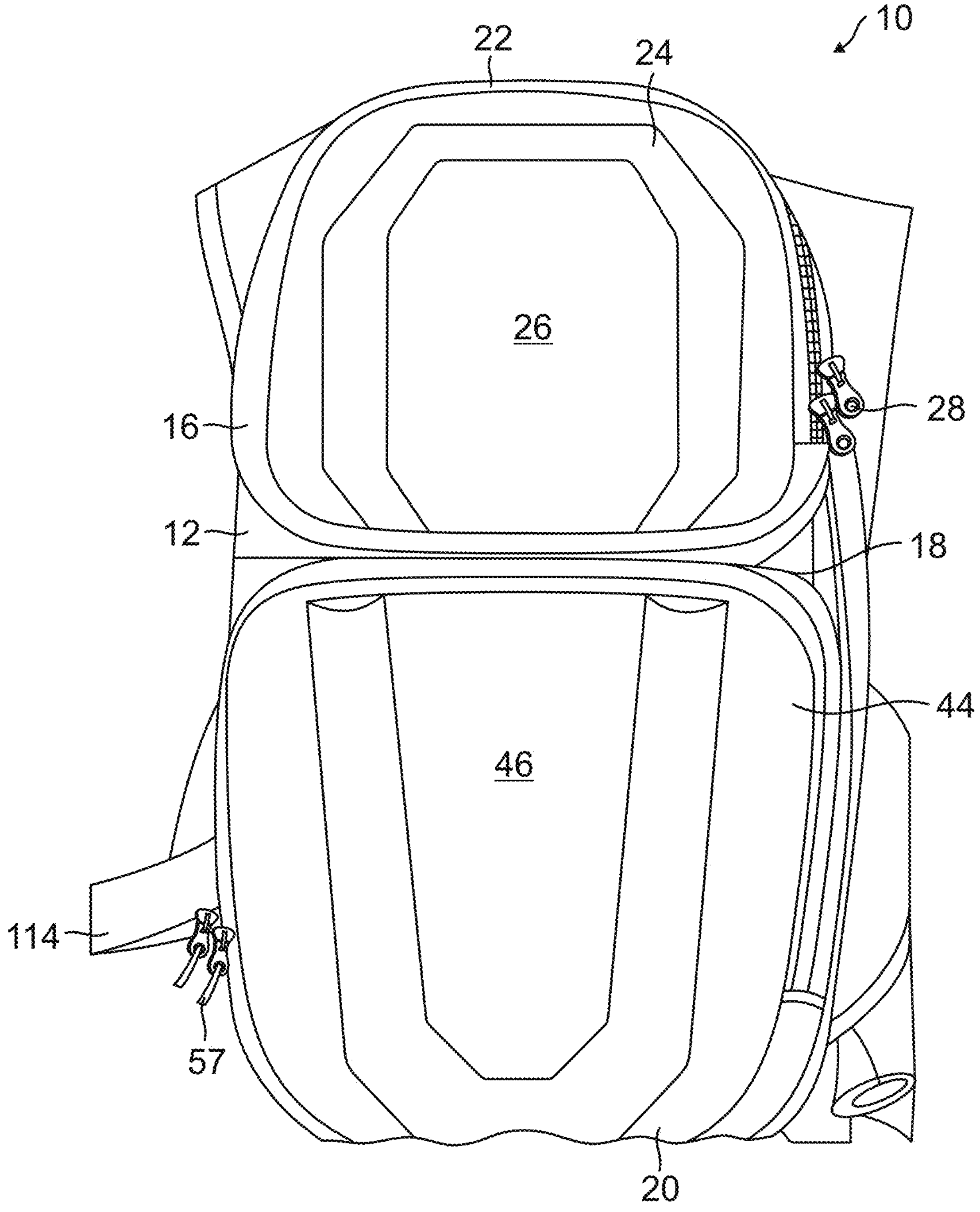
FIG. 5 is a front view of the backpack of the instant invention illustrating the specialized covers over the top and bottom compartments.
Figure 6:
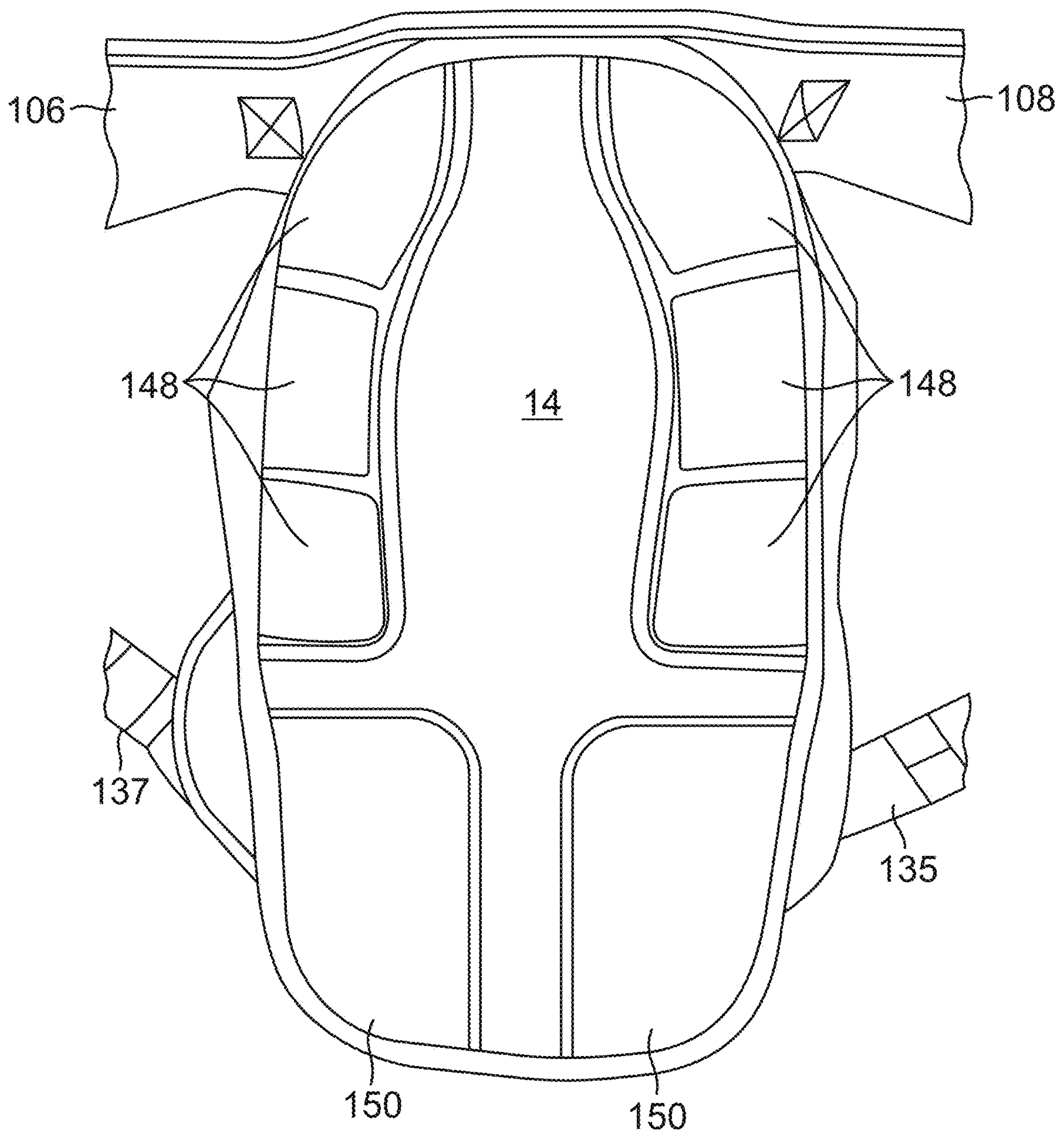
FIG. 6 is a back view of the backpack of the instant invention illustrating the specialized pads on the upper and bottom portions.

FIG. 5 is a front view of the backpack 18 showing the from 12 with its top compartment 24 with rigid shell lid 26 as well as the bottom compartment 44 with its own rigid shell lid 46 to fully protect the components housed therein. This view also shows the previously mentioned zippers 28, 57 to the top 24 and bottom 44 compartments. The two sides 16, 18, the top 22 and the bottom 20 are also visible in this view. The spray hose 64 passes through the bottom portion 20 of the backpack 10. FIG. 6 shows the back 14 of the backpack 10, which includes portions of the first strap 106 and the second strap 108. Also visible are the first and second bottom straps 135, 137 which are adjustable for tightening and proper fitting. Highlighted in this view are the top EVA pads 148 near the top molded for comfort and the bottom padding 150 near the bottom made of breathable padded foam.

Figure 7:
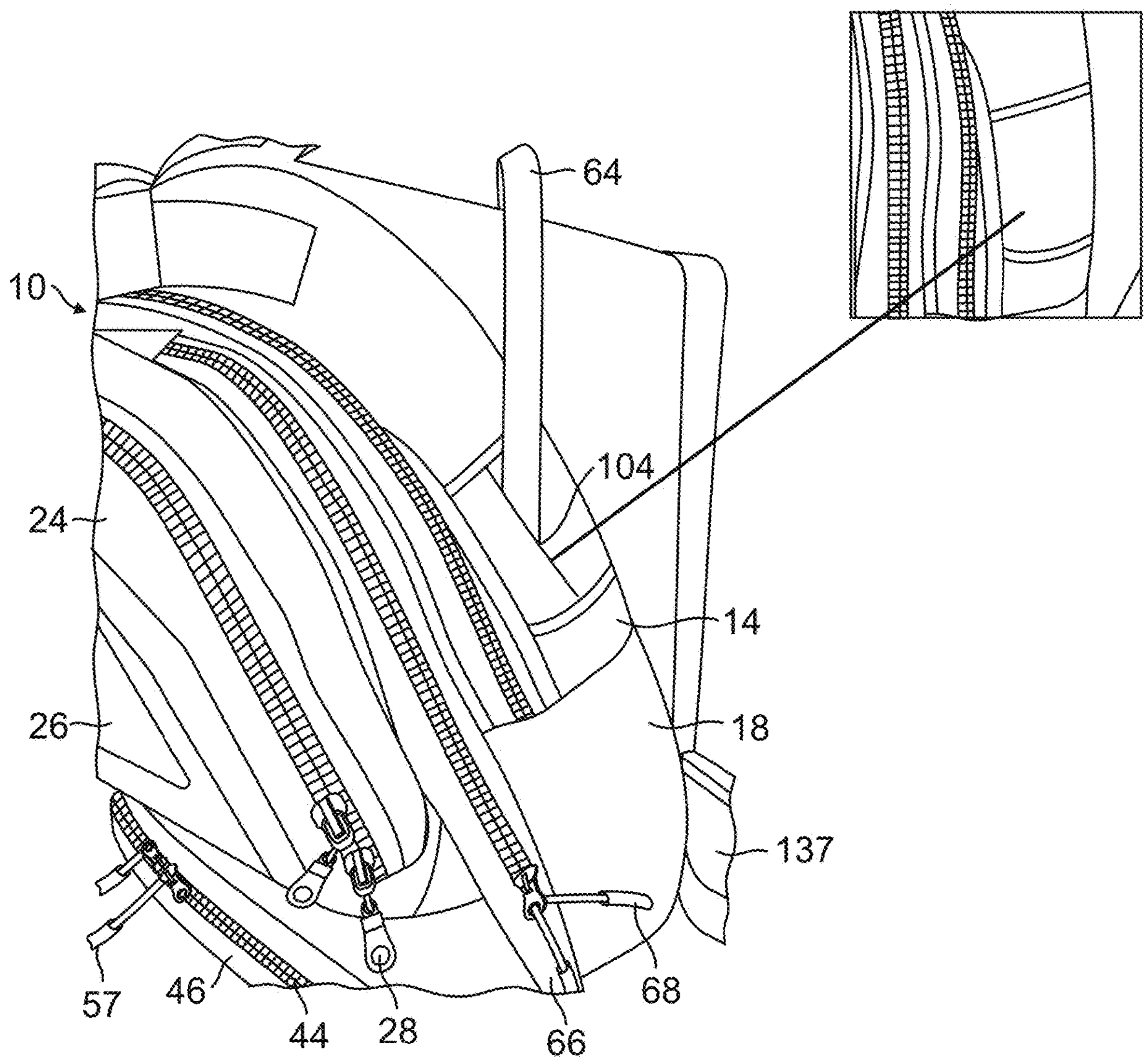
FIG. 7 is a top side view of the portion of the backpack where the hose exits to go over the shoulder of the user.

FIG. 7 shows a close-up top perspective view of the area of the side 14 of the backpack 10 where the ⅛ inch hose 64 exits and goes over the shoulder of the user. The cut out portion highlights the area where the hose 64 exits. In this view, the hole 104 where the hose 64 exits is visible s well as the closed intermediate pocket 66 where the wires are secured as well as the zipper 68 that opens this compartment.

Figure 8:
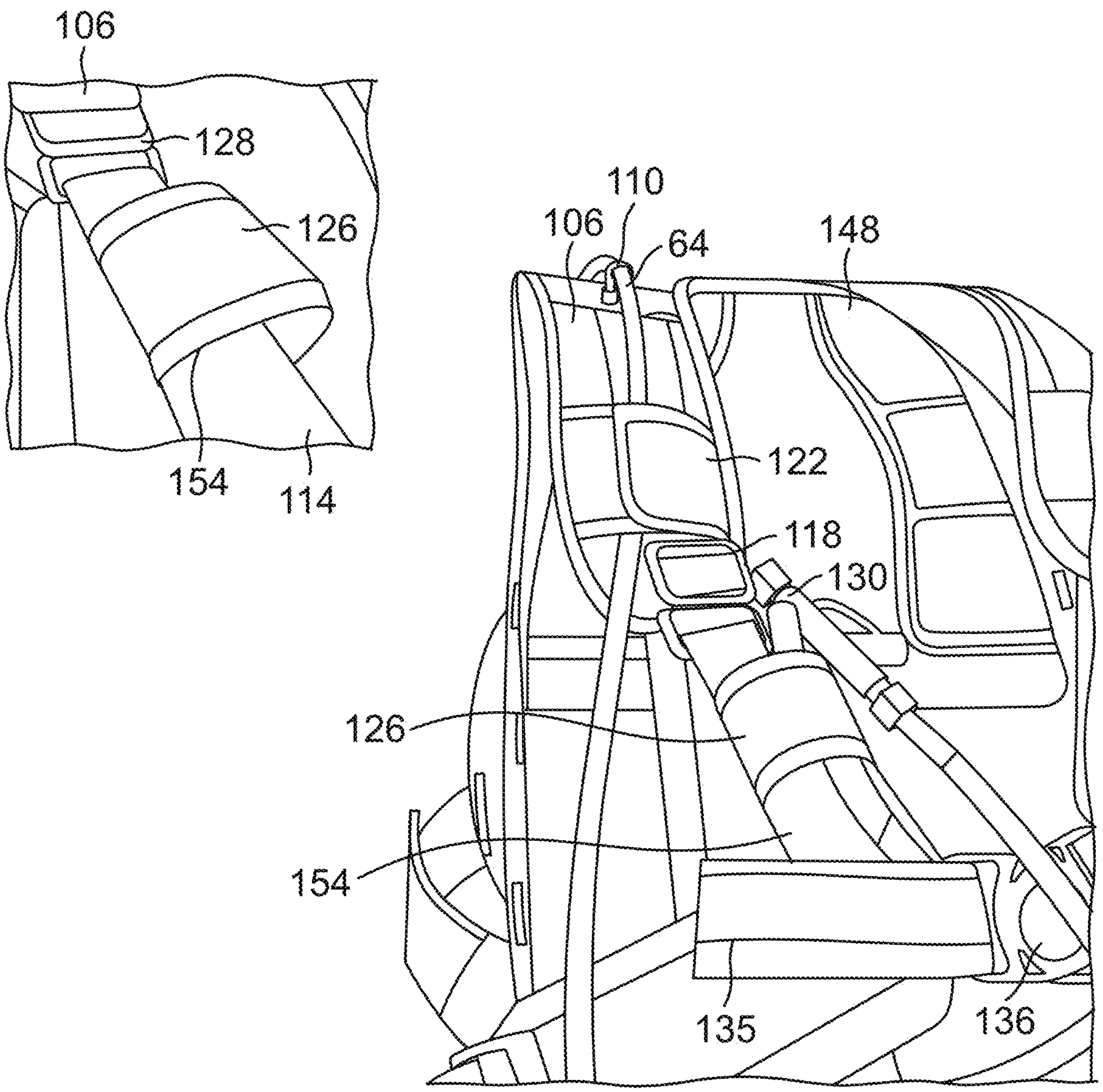
FIG. 8 is a side view of the back of the backpack of the instant invention highlighting how the hose is secured to the strap and over the shoulder of the user.

Like FIG. 7, FIG. 8 shows a close-up portion with a cut-out for more detail. This close-up portion shows one of the straps 106 on the back of the backpack and how it secures the nozzle 130 of the ⅛ inch spray hose 64. The top of the strap 106 is connected to an adjustment buckle 188 which attaches to the bottom of the strap 114. Between the bottom portion of the strap 114 and the adjustment buckle 118 is a securing strap 126 for the nozzle 130 under which is a magnet 154 that keeps the metal nozzle 130 secured in place. Also seen in this view is an upper hook 110 on the top portion of the strap 106 that holds the ⅛ inch portion of the spray hose 64 securely in place thereon. The swivel 76 connecting the ⅛ inch spray hose *6r* to the nozzle 130 is also seen in this view.

Figure 9:
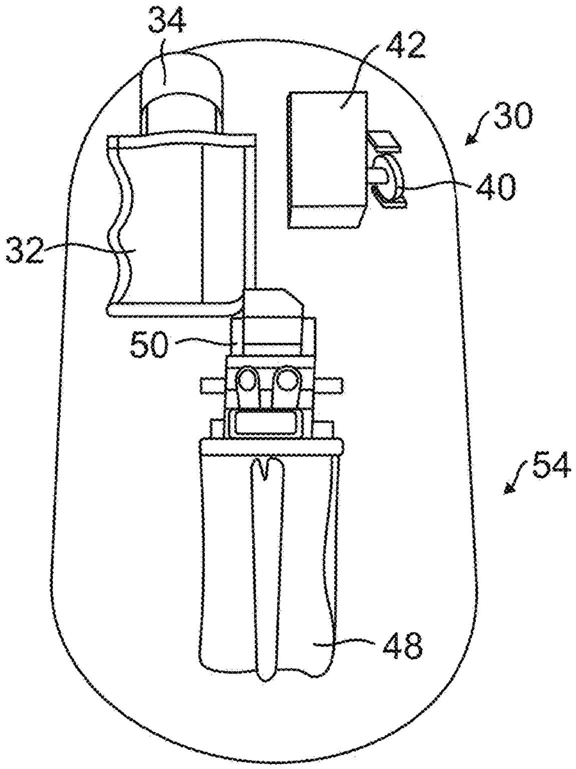
FIG. 9 is a front view of the inside components of the top front compartment of the backpack of the instant invention where the battery, controller and pump are housed.

FIG. 9 shows what is hosed and how inside of the interior 30 of the top front compartment as well as the interior 54 of the bottom front compartment shown together even though they are preferably separate components. This is shown as a kind of schematic and not literally how the elements are placed. At the top is a pocket/pouch 32 that houses the battery 34 which is next to the controller 42 whose wire exits this compartment through an aperture 40. The controller 42 and the battery 34 would be connected by a wire, not shown in this view as the wires for both exit through apertures that enter into the adjacent compartment 66. Below them and housed in the bottom compartment is the pump 50 with its own specialized pocket/pouch 48.

Figure 10:
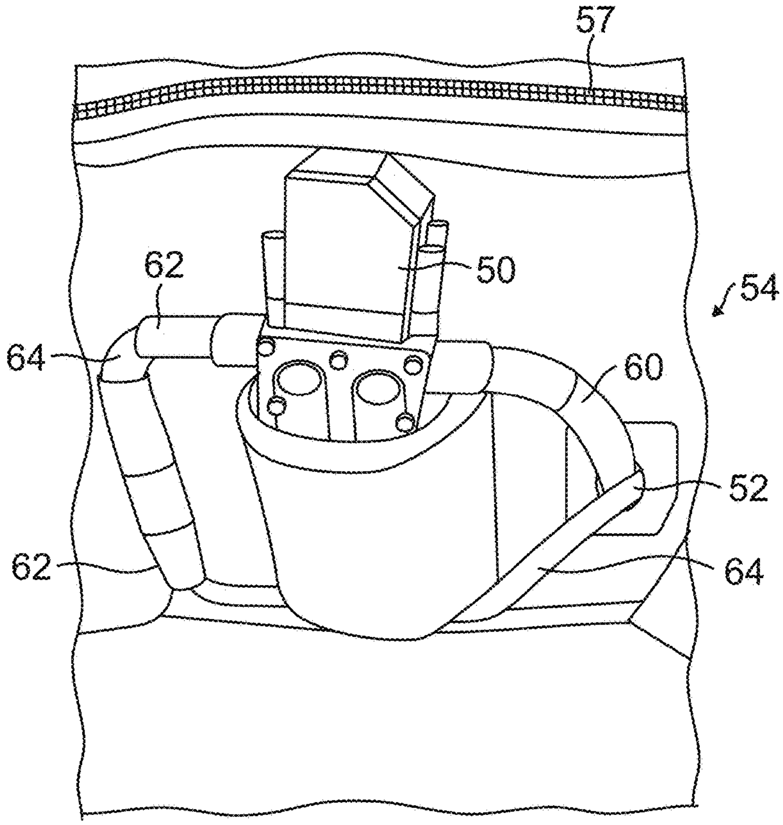
FIG. 10 is a top perspective view of the pump of the instant invention as it is housed in the bottom front compartment of the backpack.

FIG. 10 shows a view from the top of the open bottom front compartment 54 where the pump 50 sits in the pocket/pouch 48. The pump has a t-shape between the mechanics of the pump and the two hoses. On one side is the ⅛ inch spray hose 64 with a quick connect 62. On the other side is the ¼ inch bladder connecting hose 60. Both hoses 60, 64 exit through an aperture 52 that sends the hoses 60, 64 into the bladder compartment 82.

Figure 13:
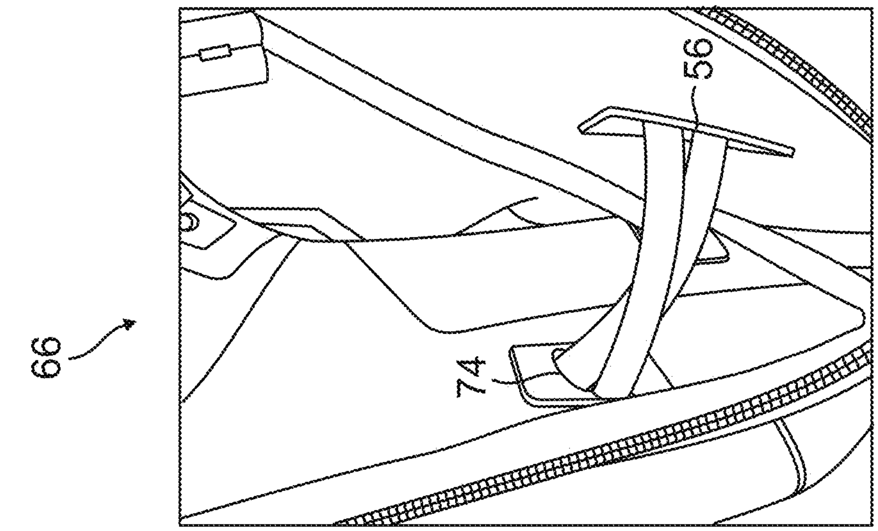
FIG. 13 shows the same view as FIGS. 11 and 12 highlighting where the hose pumps enter and exit the intermediate pocket.
Figure 12:
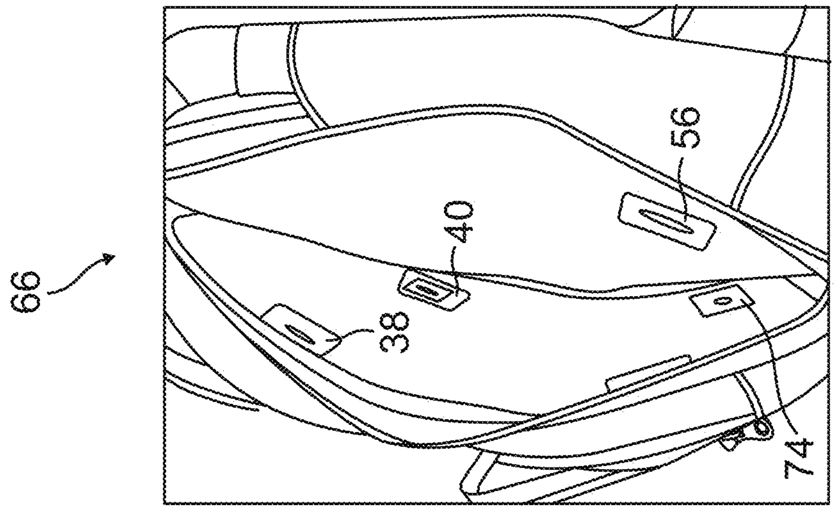
FIG. 12 shows the same view as FIG. 11 highlighting the holes for the wires.
Figure 11:
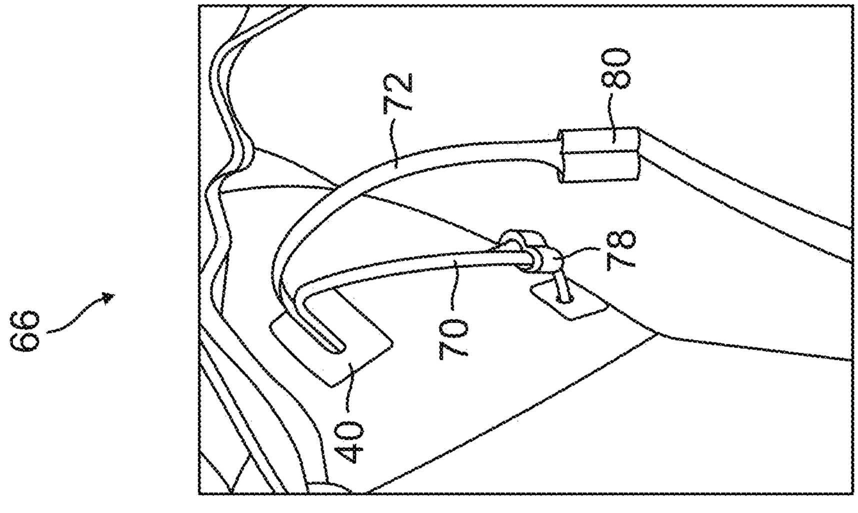
FIG. 11 shows the inside of the intermediate pocket portion of the instant invention where the wires are secured.

Various views of the compartment between the front compartments and bladder compartment, i.e., the intermediate compartment 66 are shown in FIGS. 11-13. In FIG. 11 we can see the hole 40 through which the wires from the controller 70, 72 connecting the controller and battery as well as the controller and pump are shown. The wires 70, 72 are further protected with electrical wire connectors 78, 80. A hole 38 for the battery wire 70 to connect to the controller is also shown in this view. In FIG. 12 we see this compartment with just the holes 38, 40 and not the wires shown in FIG. 11. Additionally, we see hole 56 for the pump cable and hole 74 to the bladder compartment. FIG. 13 shows these holes 56, 74 with the hoses 60, 62 passing therethrough.

Figure 14:
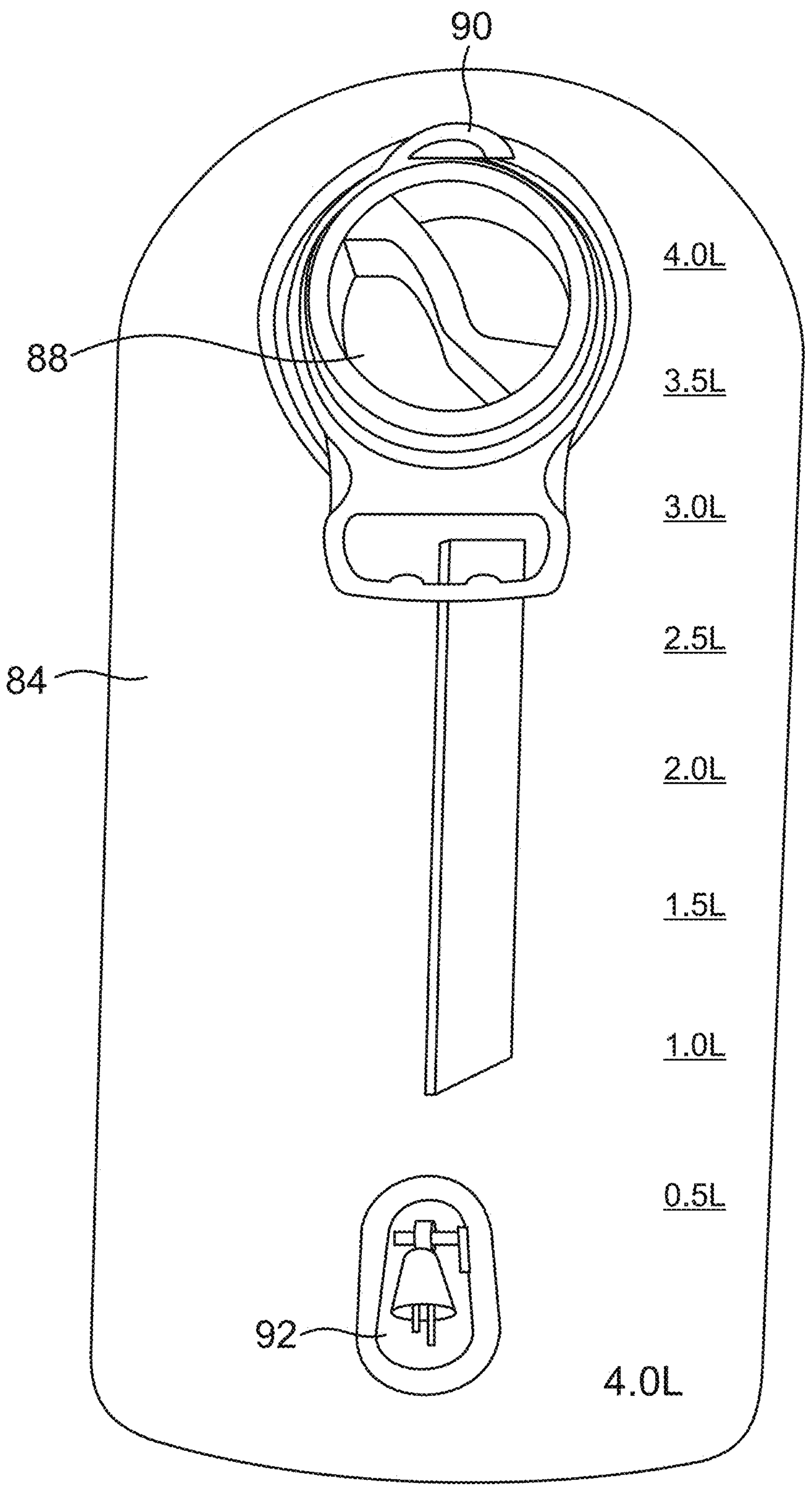
FIG. 14 shows the specialized 4 liter plus bladder of the instant invention.

FIG. 14 is a front view of the specialized bladder 84 of the instant invention that is housed inside of the bladder compartment 82, which holds four liters of fluid or more. The bladder has a hose connector 92 near the bottom to draw water from using the pump. The specialized bladder cap/dial 90 is oversized for ease of use and comes with a hook 90 around the dial bladder filler 88 for attachment to the inside of the bladder compartment 82 to the bladder connecting strap 86 seen in FIG. 4.

Figure 15:
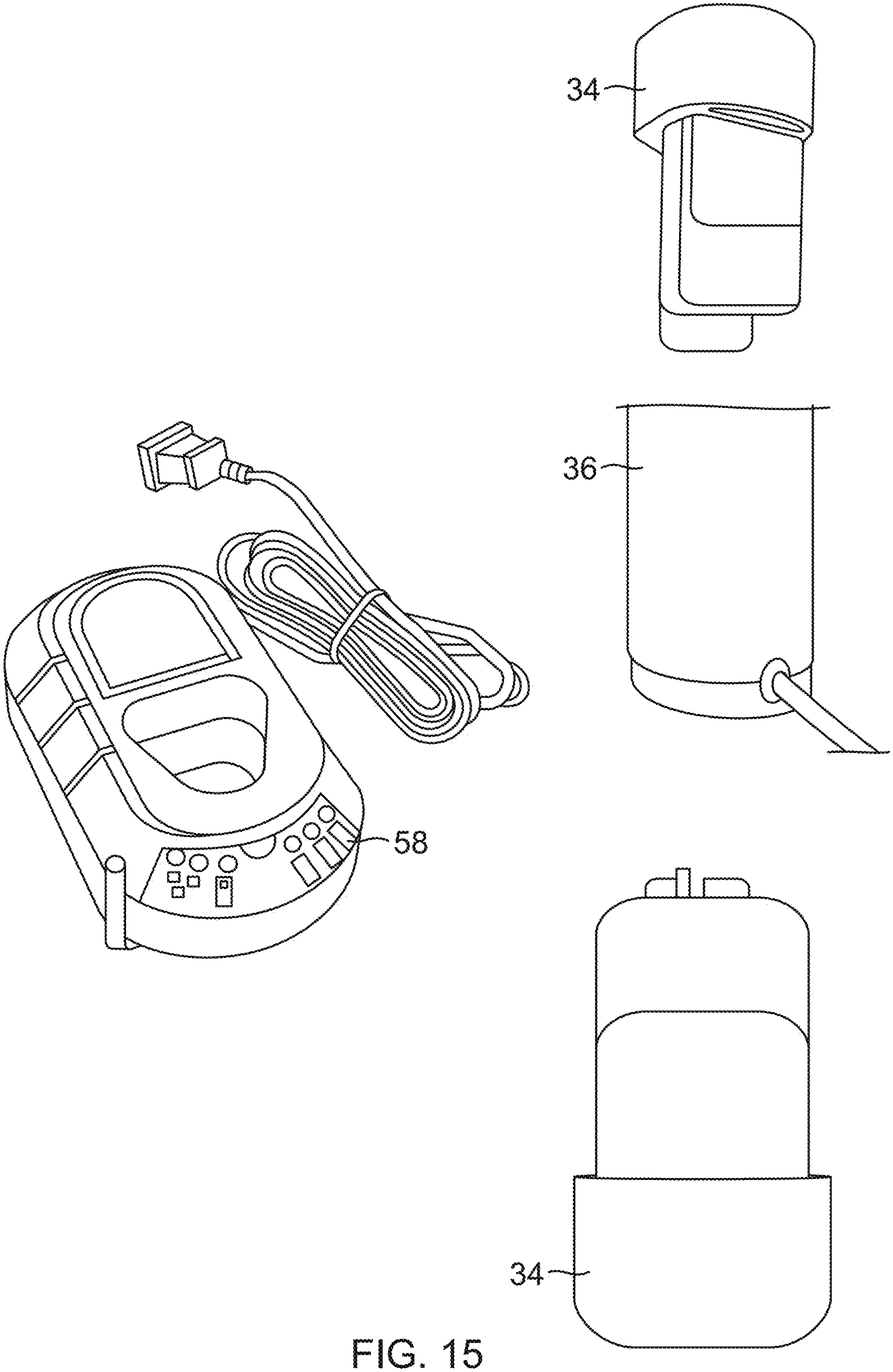
FIG. 15 shows the specialized case and specialized charger for the specialized battery powering the device of the instant invention.

FIG. 15 shows the various specialized components of the battery 34 which includes the case 36 that is housed in the top front component of the backpack, but also the battery charger 58 which is not a permanently affixed part of the backpack, but what provides power to the lithium ion battery.

Figure 16:
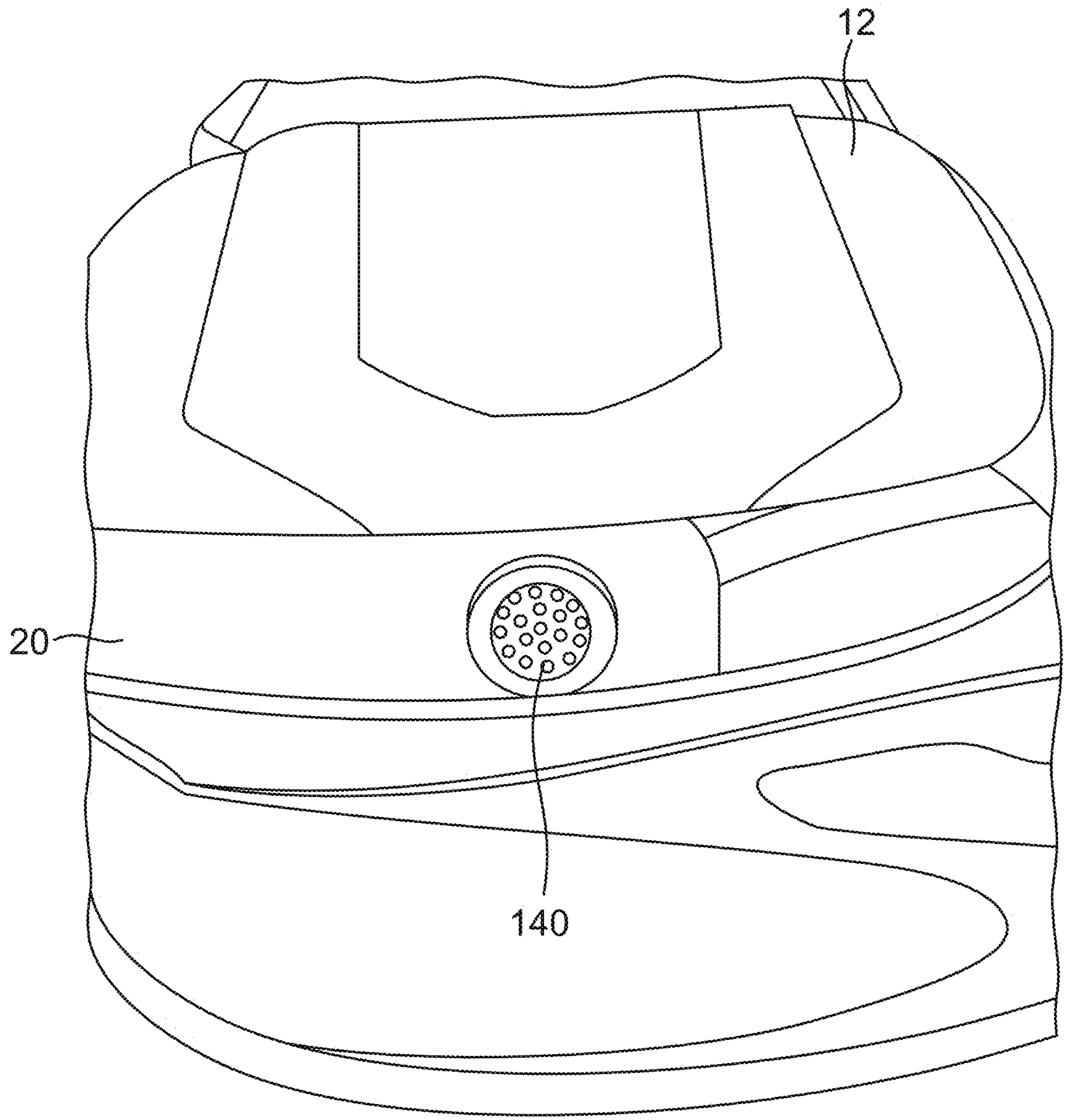
FIG. 16 shows the bottom of the backpack of the instant invention where the drain holes are visible.
Figure 17:
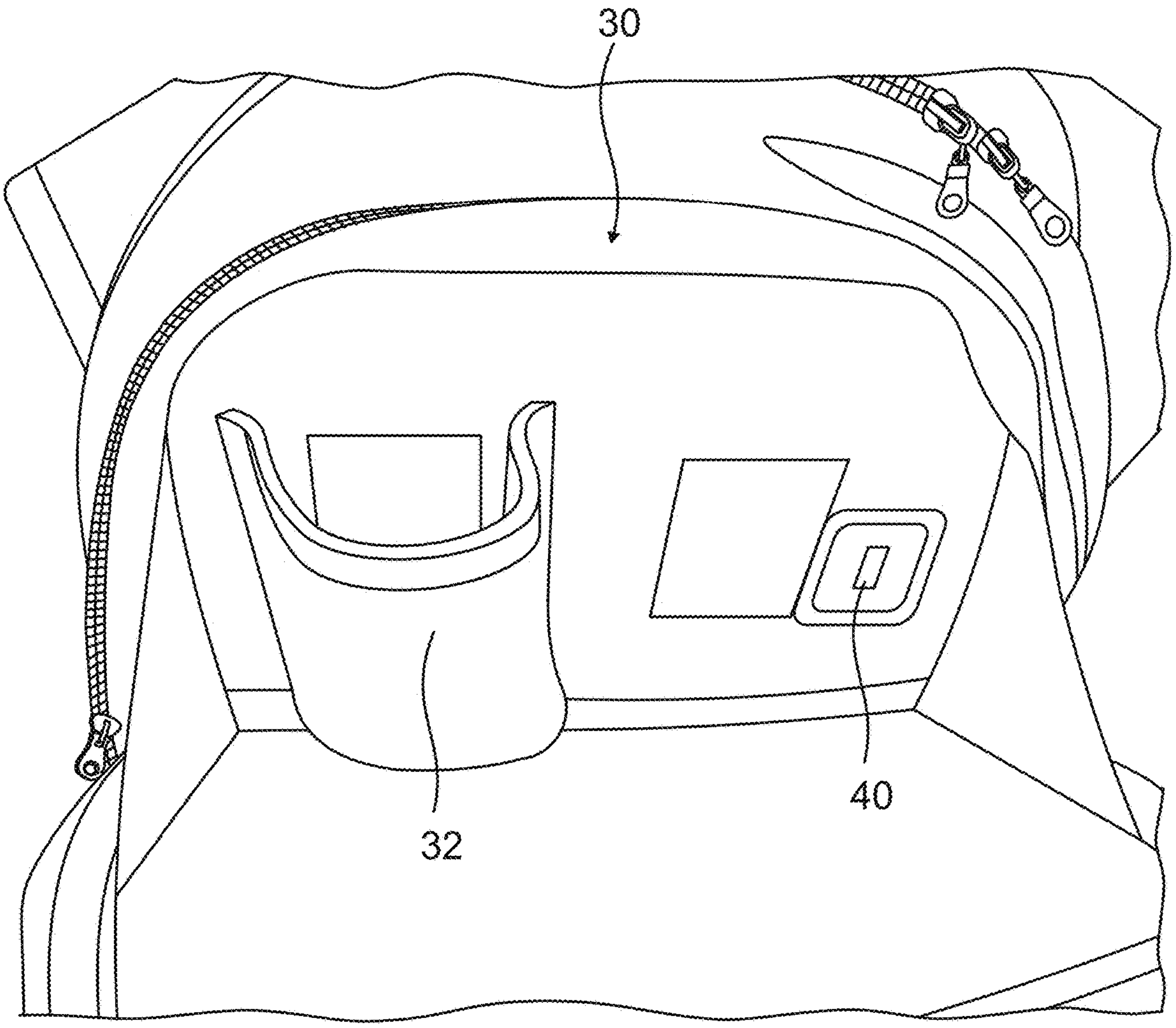
FIG. 17 is a top view of the top compartment of the front of the backpack of the invention where the battery pouch and hole for the wire from the controller are visible.

FIG. 16 shows the bottom 20 of the backpack 10 where the drain hole 140 is visible. More than one hole may be present. This drain hole 140 adds breathability in general for the water pump where this one is shown, but there is also a drainage hole from the bladder compartment which allows for any fluid to escape in the event of a bladder leak. FIG. 17 just shows a top inside view into the top front compartment where the battery pouch 32 is clearly visible next to where the controller would go and its associate aperture 40 into the wire intermediate compartment 66.

The invention illustratively disclosed herein suitably may be practiced in the absence of any element which is not specifically disclosed herein.

The discussion included in this detailed description is intended to serve as a basic description. The reader should be aware that the specific discussion may not explicitly describe all embodiments possible and alternatives are implicit. Also, this discussion may not fully explain the generic nature of the invention and may not explicitly show how each element feature or can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A mobile spray device that can be worn on the body of a user comprising:

an enclosed main body with a bottom, a top, back panel, a front panel and side walls that are openable with a first zipper that opens up a back compartment, said back compartment further comprising:

a thermofoil lining through an interior portion of said back compartment; and a hook and loop strap adjacent to a top rear of said interior portion of said back compartment;

an intermediate compartment in front of said back compartment with a second zipper, said intermediate compartment further comprising:

apertures on one side to receive wires and hoses wherein said hoses include pump hoses, a fill hose and a spray hose; and an aperture on an opposite side to transfer hoses received through said apertures on said one side of said intermediate compartment into said back compartment;

a top front compartment in front of said intermediate compartment, said top front compartment further comprising:

corresponding apertures with said apertures on said one side of said intermediate compartment for the placement therethrough of wires;

a securing area for a controller; and a sleeve for housing a battery;

a bottom front compartment below said top front compartment, said bottom front compartment further comprising:

a sleeve for the housing of a pump; and an aperture to correspond to said aperture on said opposite side of said intermediate compartment for the placement therethrough of aid pump hoses to and from said pump; and a sleeve for the housing of a pump;

a bladder with a capacity of four liters or more of fluid, said bladder having a dial for the introduction of fluid thereon, said dial including a hook for attachment to said hook and loop strap adjacent to said top rear of said interior portion of said back compartment, said bladder having an attachment to said fill hose, said bladder having an attachment to said fill hose wherein said fill hose passes through an aperture in said back compartment, through said aperture in said intermediate compartment into said bottom front compartment, said fill hose being attached to a first side of said pump containable in said sleeve for the housing of a pump;

a spray trigger attached to said spray hose, said spray house passing through said aperture in said back compartment into said bottom front compartment, said spray hose having a smaller diameter than said fill house, said spray hose being attached to a second side of said pump containable in said sleeve for the housing of a pump; and a pair of straps on said back panel of said mobile spray device configured to allow for the wearing of said device on the back of said user.

2. The mobile spray device as defined in claim 1 wherein said spray hose has a diameter of ⅛".

3. The mobile spray device as defined in claim 1 wherein said fill hose has a diameter of ¼".

4. The mobile spray device as defined in claim 1 wherein quick connectors connect said fill hose and said spray hose to said pump.

5. The mobile spray device as defined in claim 1 wherein crimped hose clamps are used to secure said spray hose and said fill hose with a clamp heat sink used to protect said crimped hose clamps.

6. The mobile spray device as defined in claim 1 wherein said pump is a 12V 90 psi reinforced diaphragm pump with a four screw head and nylon reinforced body plate cover.

7. The mobile spray device as defined in claim 1 wherein said front top compartment and said front bottom compartments are covered with firm shell covers.

8. The mobile spray device as defined in claim 1 wherein said controller has an on/off switch with a PCM circuit board to regulate a voltage and an LED level indicator to indicate a battery charge.

9. The mobile spray device as defined in claim 1 wherein said battery is a rechargeable lithium battery with a cylindrical shape.

10. The mobile spray device as defined in claim 9 wherein a battery charger configured into a shape of said battery is used to charge said battery.

11. The mobile spray device as defined in claim 1 wherein said spray trigger is made of a metal.

12. The mobile spray device as defined in claim 11 wherein a magnet is incorporated into a holster on one of said pair of straps for securement thereto of said metallic spray trigger.

13. The mobile spray device as defined in claim 1 wherein molded back pads are incorporated into said back panel of said mobile spray device.

14. The mobile spray device as defined in claim 1 wherein ventilated foam pads are incorporated into said back panel of said mobile spray device.

15. The mobile spray device as defined in claim 1 wherein one or more drainage ports are located at said bottom of said mobile spray device.

16. The mobile spray device as defined in claim 1 wherein hose keepers are attached to one of said pair of straps to secure said spray hose therein.

17. The mobile spray device as defined in claim 1 wherein brass swivels are attached to said spray hose.

18. The mobile spray device as defined in claim 1 wherein brass swivels are attached to said fill hose.

19. The mobile spray device as defined in claim 1 wherein a PVC top handle grip is attached to said top of said mobile spray device.

* * * * *